Figure 1:
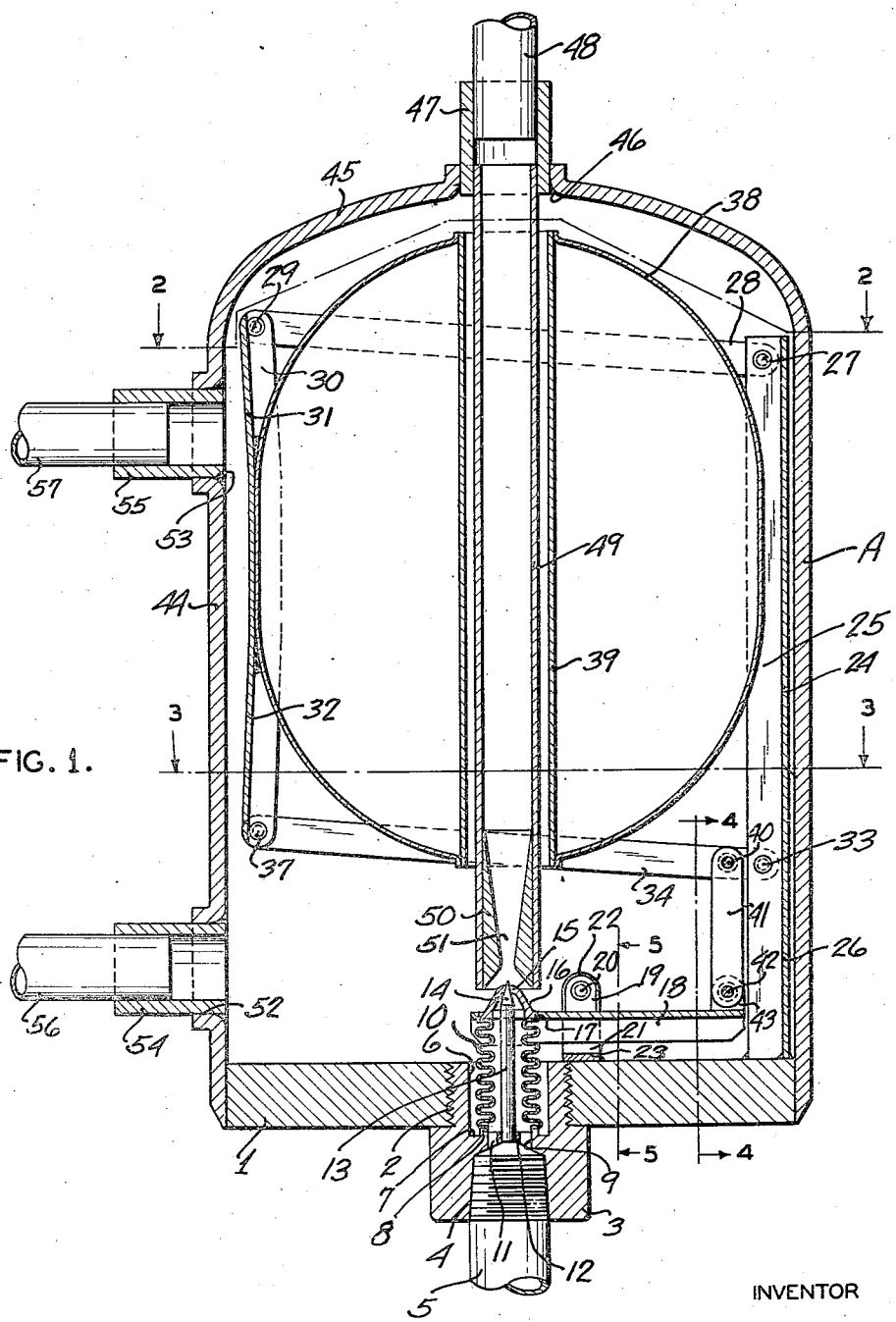

March 31, 1942.  P. H. THOMPSON  2,278,000
LIQUID LEVEL CONTROL VALVE
Filed May 8, 1939  3 Sheets-Sheet 1

INVENTOR
PARKE H. THOMPSON
BY
ATTORNEY

March 31, 1942. P. H. THOMPSON 2,278,000
LIQUID LEVEL CONTROL VALVE
Filed May 8, 1939 3 Sheets-Sheet 2
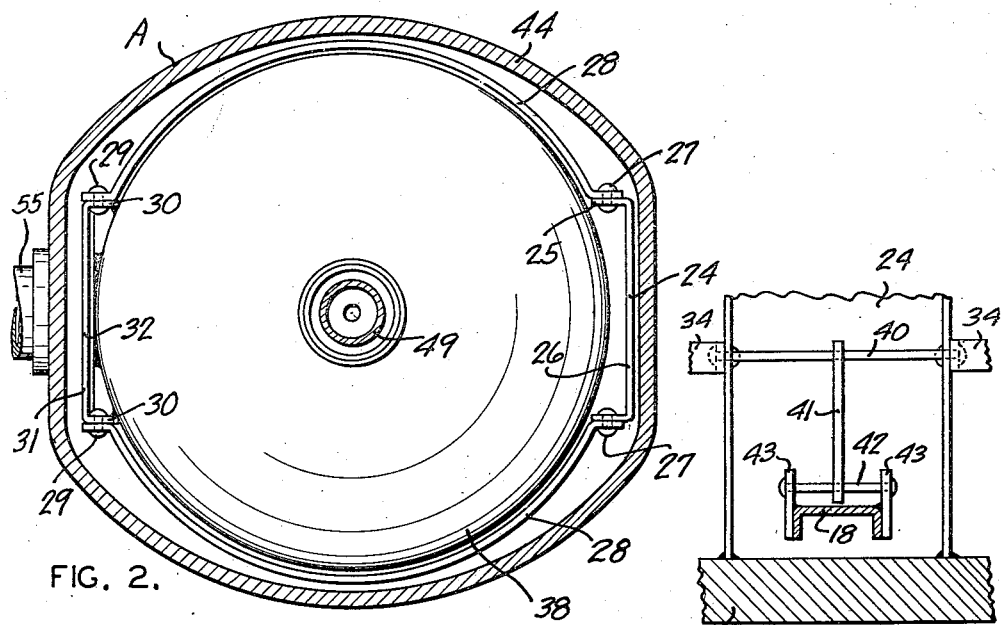
FIG. 2.
FIG. 4.
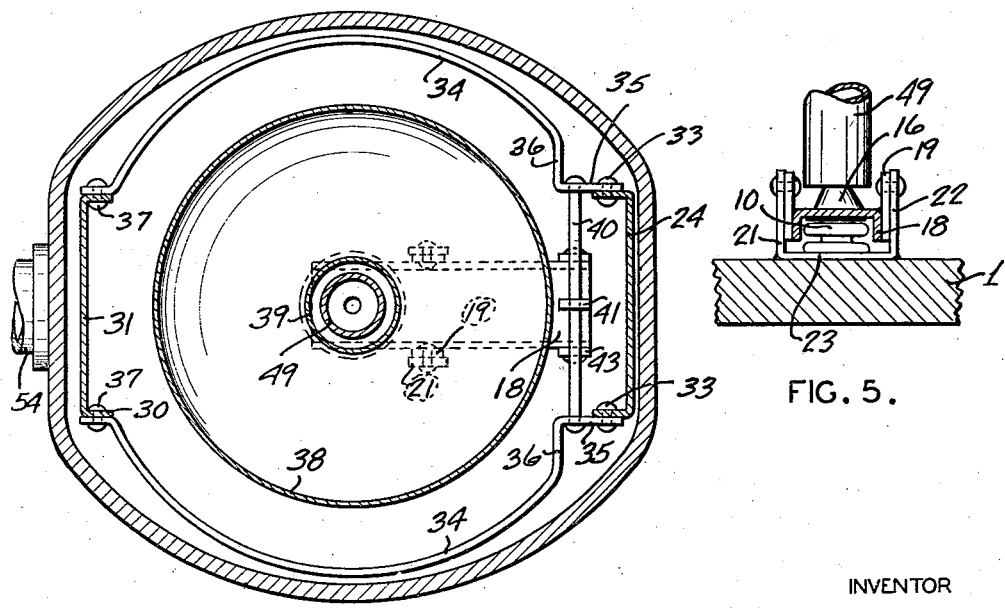
FIG. 3.
FIG. 5.
INVENTOR
PARKE H. THOMPSON
BY
ATTORNEY March 31, 1942.  P. H. THOMPSON  2,278,000
LIQUID LEVEL CONTROL VALVE
Filed May 8, 1939    3 Sheets-Sheet 3
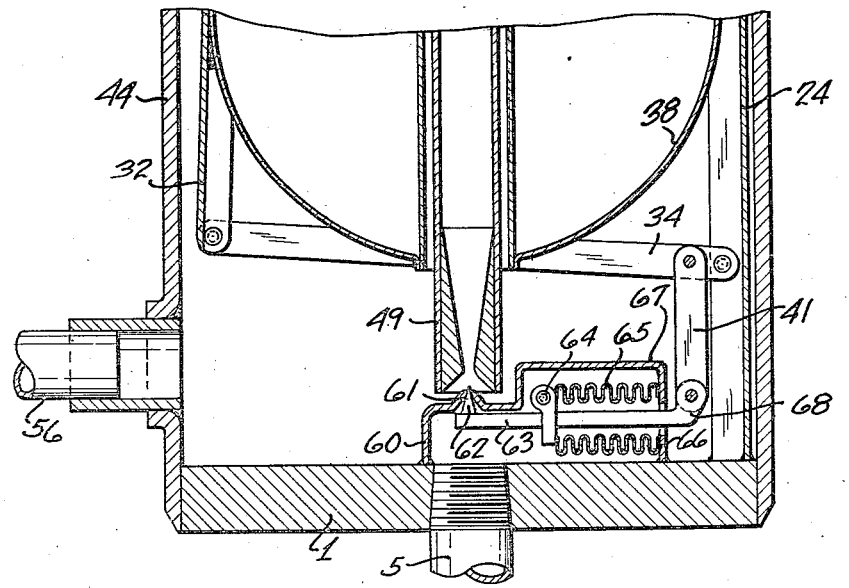
FIG. 6.
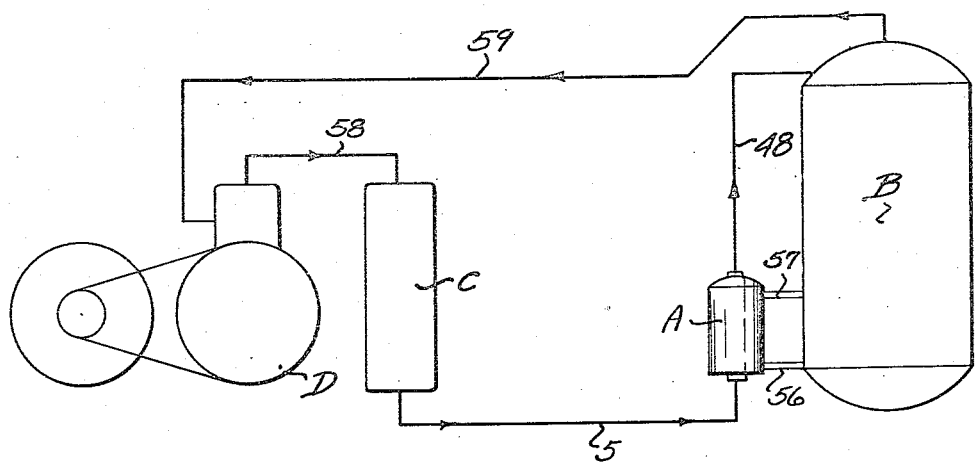
FIG. 7.
INVENTOR
PARKE H. THOMPSON
ATTORNEY Patented Mar. 31, 1942

2,278,000

UNITED STATES PATENT OFFICE 2,278,000

LIQUID LEVEL CONTROL VALVE

Parke H. Thompson, Millville, N. J., assignor of thirty-five per cent to Russell Maguire, New York, N. Y.

Application May 8, 1939, Serial No. 272,374

10 Claims. (Cl. 137—68)

This invention relates generally to control valves and, more particularly, to a certain new and useful improvement in liquid level responsive recirculating control valves particularly adapted for use in connection with refrigerating systems and the like, and is related to my co-pending applications Serial Nos. 272,373, filed May 8, 1939, and 280,720, filed June 23, 1939.

My invention has for its primary objects the provision of a control valve of the type stated, which is simple and economical in construction, which has a relatively small number of moving parts and is rugged and durable, which is designed for compactness and simplicity of assembly, and which is highly efficient in the performance of its intended functions.

And with the above and other objects in view, my invention resides in the novel features of form, construction, arrangement, and combination of parts presently described and pointed out in the claims.

In the accompanying drawings (3 sheets)—

Figure 1 is a longitudinal sectional view of a control valve constructed in accordance with and embodying my present invention;

Figures 2 and 3 are transverse sectional views of the valve, taken approximately along the lines 2—2 and 3—3, respectively, Figure 1;

Figures 4 and 5 are detail sectional views of the valve, taken approximately along the lines 4—4 and 5—5, respectively, Figure 1;

Figure 6 is a fragmentary sectional view of a modified form of valve embodying the present invention; and Figure 7 is a diagrammatic view of a refrigerating system incorporating a control valve of my present invention.

Referring now in more detail and by reference characters to the drawings, A is a control valve which embodies my invention in preferred form and includes a base-member 1 centrally provided with a threaded aperture 2 for receiving an inlet-nipple 3 having a preferably integral internally threaded collar 4 for receiving a liquid refrigerant supply line 5.

The inlet-nipple 3 is also provided with a longitudinally extending channel 6 having a bottom wall 7 having an annular boss 8 counterbored in the provision of an inlet aperture 9.

Welded or otherwise permanently seated upon the upper face of the boss 8 and extending longitudinally through and beyond the channel 6, is a flexible cylindrical bellows 10.

Rigidly secured by means of radial lugs 11 co-axially within the aperture 9, is a collar 12 supportingly engaging the lower extremity of a valve pin 13 which extends axially through the bellows 10 and is ground off at its upper extremity to a seat-forming point 14 for co-operative engagement in the orifice 15 of a shiftable valve nozzle 16 welded or otherwise fixed upon the upper end of the bellows 10 and having an annular flange 17 for rigid connection with a transversely disposed actuating lever 18.

Intermediate its ends, the lever 18 is provided with a pair of upstanding ears 19 for pivotally supporting a transversely extending rod 20 mounted at its ends in the legs 21 of a U-shaped bracket 22 welded or otherwise fixed along its bight 23 upon the base 1, all as best seen in Figures 1 and 5 and for purposes presently fully appearing.

Welded or otherwise fixed at its lower extremity upon the base 1 adjacent the outer extremity of the lever 18, is an upstanding or longitudinally extending channel-shaped float-supporting upright 24 having its opposed parallel legs 25 presented inwardly and swingably connected to which, as by means of axially aligned rivets 27, is a pair of longitudinally bowed or arcuate links 28 pivotally connected at their opposite end, as at 29, to the opposed parallel legs 30 of a channel-shaped longitudinally extending link 31, all as best seen in Figures 1 and 2 and for purposes presently fully appearing.

Also pivotally mounted, as at 33, upon the legs 25, and adjacent the lower end, of the upright 24, is a second pair of arcuate or bowed links 34. As best seen in Figure 3, each link 34 has a straight end-portion 35 presented inwardly of the valve and then an outwardly presented intermediate portion 36 substantially parallel to the bight 26 of the upright 24, the links 34 being hingedly connected at their opposite extremities, as at 37, to the legs 30 of the link 31, all as best seen in Figures 1 and 3.

Welded or otherwise fixed to and along the mid section of the web or bight 32 of the link 31, is a hollow float ball 38 suitably sized for operative disposition within the parallel pairs of pivotally connected links 28, 34, and provided with an axial tube 39 disposed longitudinally of the valve, all as best seen in Figure 1 and for purposes presently fully appearing.

Mounted at its ends in, and extending transversely between, the end-portions 35 of the lower links 34 in spaced relation to the pivots 33, is a cross rod 40 centrally provided with a free-swinging downwardly depending connecting link 41 pivotally fastened at its lower extremity to and upon a pintle 42 mounted at its opposite ends in bearing-ears 43 welded or otherwise fixed upon the outer or free end of the actuating lever 18, all as best seen in Figures 1 and 4 and for purposes presently fully appearing.

Welded or otherwise fixed to, and disposed embracingly about the outer periphery of, the base 1, is an upstanding shell or body 44 conforming in cross sectional shape to the peripheral shape of the base 1 and sized to extend upwardly above the upper limit of swinging travel of the float ball 38, the shell or body 44 being provided at its upper extremity with an integrally formed dome-shaped end or top wall 45 having a central aperture 46, in which is suitably fixed a connection sleeve 47 sized for accommodating an outlet line 48.

Welded, brazed, or otherwise fixed in the lower extremity of the connection sleeve 47 and extending axially from the sleeve 47 through the tube 39 of the float ball 38, is an outlet tube 49 having an external diametral size substantially smaller than that of the tube or conduit 39, so as to obviate any interference with the movement of the float ball 38.

The outlet tube 49 terminates at a point spaced a short distance from the valve nozzle 16 and is internally provided with an insert shell 50 bored for providing a Venturi constriction 51, all as best seen in Figure 1 and for purposes presently fully appearing.

The shell or body 44 is further provided in its wall with a pair of longitudinally spaced apertures 52, 53, respectively provided with connection sleeves 54, 55, for receiving a liquid inlet line 56 and pressure equalizing line 57, all as best seen in Figure 1.

In use and operation, as illustrated in Figure 7, the valve A may be connected in parallel with the liquid filled portion of a flooded type evaporator B through the liquid inlet line 56 and to the upper portion of the evaporator B through the gas equalizing pressure line 57.

The control A is also connected through the inlet line 5 to the liquid condenser-receiver combination C, which, in turn, is connected through the supply line 58 to the compressor D.

The control A is further connected through the refrigerant outlet line 48 to the upper or inlet portion of the evaporator B, the latter being finally connected through the return or suction line 59 to the compressor D.

Initially, with the valve A and the evaporator B empty, the float ball 38 will normally drop downwardly and also swing the links 34 downwardly. Such downward motion is transmitted through the connecting link 41 to the actuating lever 18, which latter is thereby swung about the pivot rod 20 and the valve nozzle 16, in turn, shifted upwardly out of seated engagement with the seat-forming end 14 of the valve pin 13. The liquid refrigerant is hence permitted to flow upwardly through the bellows 10 past the valve orifice 15 and the Venturi constriction 51 through the outlet tube 49 and the outlet line 48 to the evaporator B.

As the evaporator B becomes filled with liquid refrigerant, the liquid will flow through the liquid inlet pipe 56 into the lower portion of the shell 44 over the base 1 and will be drawn into the outlet tube 49 by the differential pressure set up through the Venturi constriction 51 and thus recirculated with the incoming refrigerant.

As the shell 44 becomes filled to a predetermined level, the float ball 38 will rise, swinging the links 34 in a reverse direction and pivoting the actuating lever 18 so as to shift the nozzle 16 downwardly and restrict the incoming flow of liquid refrigerant through the inlet pipe 5.

Conversely, when the load on the evaporator B increases, the level of the liquid refrigerant falls as a result of evaporation, thereby causing the float ball 38 to drop and, in turn, lift the nozzle 16 from the valve pin to admit a greater quantity of refrigerant in order to meet the new load demand and, at the same time, permit a greater quantity of recirculated refrigerant to be handled, increasing the velocity of refrigerant movement within the evaporator and thereby materially increasing the evaporator efficiency.

If desired, I may thread the inlet pipe 5 directly into the base 1 and provided a fixed or immovable nozzle structure 60 having an orifice 61 positioned for valve-seating co-operation with a valve point 62 mounted upon a valve lever 63 pivoted intermediate its ends upon a transversely extending pivot hanger 64 welded or otherwise fixed to a transversely disposed cylindrical bellows 65 mounted at its outer end upon the end wall 66 of a suitable auxiliary shell 67, the end wall 66 being apertured for accommodating the projecting end 68 of the valve lever 63 for hinged connection with the link 41, all as best seen in Figure 6.

Thus, it will be seen that, by my present invention, I provide a liquid-level responsive recirculating control valve uniquely designed for increasing the efficiency and regulating the flow of liquid refrigerant to an evaporator inlet in accordance with the liquid level in the evaporator or the evaporator sump. It will be noted that all the moving parts of the present control are mounted upon a single base member, so that the entire valve may be assembled as a bench operation and finally disposed within the outer shell and welded or otherwise suitably sealed therein, thereby resulting in material economies in production and cost of manufacture.

It should be understood that changes and modifications in the form, construction, arrangement, and combination of the several parts of the valve may be made and substituted for those herein shown and described without departing from the nature and principle of my invention.

Having thus described my invention, what I claim and desire to secure by Letters Patent is:

1. A liquid-level control for use with a liquid-utilizing device comprising a shell providing a float chamber, means for connecting the chamber to said device for maintaining in the chamber a liquid level corresponding to the liquid level in the device, conduit means extending through the chamber and connected to the device for conducting a supply of fresh liquid to said device, valve means operably associated with the conduit means for controlling liquid flow therethrough, a float suspended in the chamber and connected to the valve means for valve-actuating movement responsive to the liquid-level in the chamber, and means for introducing liquid from the chamber into the conduit means for recirculation to the device with the flow of fresh liquid.

2. A liquid-level control for use with a liquid-utilizing device comprising a shell providing a float chamber, means for connecting the chamber to said device for maintaining in the chamber a liquid level corresponding to the liquid level in the device, conduit means extending through the chamber and connected to the device for conducting a supply of fresh liquid to said device, valve means operably associated with the conduit means for controlling liquid flow therethrough, a float suspended in the chamber and connected to the valve means for valve-actuating movement responsive to the liquid-level in the chamber, and Venturi means for introducing liquid from the chamber into the conduit means for recirculation to the device with the flow of fresh liquid.

3. A liquid-level control for use with a liquid-utilizing device comprising a shell providing a float chamber, means for connecting the chamber to said device for maintaining in the chamber a liquid level corresponding to the liquid level in the device, conduit means extending through the chamber and connected to the device for conducting a supply of fresh liquid to said device, valve means operably associated with the conduit means for controlling liquid flow therethrough, a float suspended in the chamber and connected to the valve means for valve-actuating movement responsive to the liquid-level in the chamber, and means associated with the valve means for introducing liquid from the chamber into the conduit means for recirculation to the device with the flow of fresh liquid.

4. In a liquid-level control, a base member having an inlet opening, a valve pin projecting from the opening, a bellows disposed around the pin and enclosing the opening, an orifice-forming member mounted on the bellows for movement into and out of engagement with the valve pin, an upright on the base, a float ball swingingly mounted on the upright, a series of interconnected links operatively connecting the float ball and the orifice-forming member for actuating the latter, and a chamber-providing shell mounted on the base for enclosing the float ball and orifice-forming member.

5. A liquid-level control comprising a valve body having a float chamber, a tube extending through the chamber and terminating adjacent a wall of the chamber, a nozzle having connection with a supply of incoming liquid and terminating in axially spaced alignment with the end of the tube for injecting liquid into the tube, valve means mounted directly in the nozzle for controlling the flow of liquid therethrough, a float suspended in the chamber and connected to the valve means for valve-actuating movement responsive to the liquid-level in the chamber, and means introducing liquid into the conduit means for recirculation.

6. In a liquid-level control, a base member having an inlet opening, a valve pin projecting from the opening, a bellows disposed around the pin and enclosing the opening, an orifice-forming member mounted on the bellows for movement into and out of engagement with the valve pin, an upright on the base, a float ball swingingly mounted on the upright, and a series of interconnected links operatively connecting the float ball and the orifice-forming member for actuating the latter.

7. In a liquid-level control, a base member, a float member, an upright on the base, a plurality of spaced parallel pairs of links swingably mounted on the upright and connected at their outer ends by a vertical link secured intermediate its end to the float member.

8. In a liquid-level control, a base member having an inlet opening, a valve means operatively mounted around the opening for controlling the flow therethrough, an upright on the base, upper and lower pairs of outwardly bowed links connected at their outer ends by a vertical link in the formation of a jointed frame, a float ball mounted on the vertical link and disposed within the frame, a series of interconnected links operatively connecting the vertical link and the valve means for actuating the latter responsive to movement of the float.

9. A liquid-level control for use with a liquid-utilizing device comprising a shell forming a float chamber and being adapted for connection to the device for maintaining in the chamber a liquid level corresponding to the liquid level in the device, a float shiftably mounted in the chamber, conduit means extending through the chamber for conducting a flow of fresh liquid through the chamber to the device, Venturi means associated with the conduit means and communicating with the chamber for drawing liquid from the chamber into the conduit means for recirculation with the fresh liquid, throttling means operatively associated with the Venturi means for controlling the flow of fresh liquid through the conduit means, and means connecting the throttling means with the float for actuating the throttling means responsive to variations in the liquid level within the chamber.

10. A liquid-level control for use with a liquid-utilizing device comprising a shell forming a float chamber and being adapted for connection to the device for maintaining in the chamber a liquid level corresponding to the liquid level in the device, a float shiftably mounted in the chamber, conduit means extending through the chamber for conducting a flow of fresh liquid throught the chamber to the device, Venturi means associated with the conduit means and communicating with the chamber for drawing liquid from the chamber into the conduit means for recirculation with the fresh liquid, and means mounted in the chamber for throttling the flow of fresh liquid directly at the Venturi means and being connected to the float for throttling movement responsive to variations of the liquid level in the chamber.

PARKE H. THOMPSON.